US012585229B2

(12) United States Patent
Rochat

(10) Patent No.: US 12,585,229 B2
(45) Date of Patent: Mar. 24, 2026

(54) CHRONOGRAPH MODULE EQUIPPED WITH A REMOVABLE WHEEL

(71) Applicant: Montres Breguet S.A., L'Abbaye (CH)

(72) Inventor: Jean-Philippe Rochat, Les Bioux (CH)

(73) Assignee: Montres Breguet S.A., L'Abbaye (CH)

( * ) Notice: Subject to any disclaimer, the term of this patent is extended or adjusted under 35 U.S.C. 154(b) by 401 days.

(21) Appl. No.: 18/311,281

(22) Filed: May 3, 2023

(65) Prior Publication Data

US 2024/0369975 A1 Nov. 7, 2024

(30) Foreign Application Priority Data

May 17, 2022 (EP) .................................... 22173862

(51) Int. Cl.
*G04F 7/08* (2006.01)

(52) U.S. Cl.
CPC .................................. *G04F 7/0866* (2013.01)

(58) Field of Classification Search
CPC ..................................................... G04F 7/0866
See application file for complete search history.

(56) References Cited

U.S. PATENT DOCUMENTS 3,543,506 A 12/1970 Dubois et al.
8,882,338 B2 * 11/2014 Mertenat ............... G04F 7/0847
368/103
9,678,477 B2 6/2017 Tanabe et al.
2004/0246820 A1 * 12/2004 Girardin ............. G04B 43/002
368/76
2017/0185040 A1 6/2017 Mertenat

FOREIGN PATENT DOCUMENTS

| | | | |
|---|---|---|---|
| CH | 11134/67 | A4 | 4/1971 |
| CH | 703 470 | A2 | 1/2012 |
| CH | 709 792 | A2 | 12/2015 |
| EP | 1 708 045 | A2 | 10/2006 |
| JP | 2012-27023 | A | 2/2012 |
| JP | 2016-61773 | A | 4/2016 |
| JP | 2017-503181 | A | 1/2017 |

OTHER PUBLICATIONS

European Search Report for EP 22 17 3862, dated Oct. 13, 2022.

* cited by examiner

*Primary Examiner* — Edwin A. Leon
*Assistant Examiner* — Jason M Collins
(74) *Attorney, Agent, or Firm* — Sughrue Mion, PLLC

(57) ABSTRACT

A chronograph module (1) including a plate, a primary shaft (3), and a primary disk (4) extending on an orthogonal plane to a longitudinal axis of the shaft. The primary shaft is fitted on the plate, such that the primary disk is engaged with a geartrain of the chronograph module. A removable wheel (2) is fitted on the primary shaft (3), and includes a peripheral gear structure and first (22) and second elastic arms (23) forming a clamp (30) to grip the primary shaft. A radial support surface (25) supports the elastic arms to assemble the removable wheel on the primary shaft. The arrangement and dimensions of the removable wheel produces an overlap of the removable wheel and an overlapping part of the module, such that the assembly of the overlapping part required the absence of the removable wheel whereas the primary shaft is fitted on the chronograph module.

13 Claims, 3 Drawing Sheets

CHRONOGRAPH MODULE EQUIPPED WITH A REMOVABLE WHEEL

CROSS REFERENCE TO RELATED APPLICATIONS

This application claims priority to European Patent Application No. 22173862.8 filed May 17, 2022, the entire contents of which are incorporated herein by reference.

TECHNICAL FIELD OF THE INVENTION

The invention relates to a chronograph module equipped with a removable wheel.

The invention further relates to a horological movement including at least one such chronograph module.

The invention relates to the field of horological mechanisms, and more specifically geartrains.

TECHNOLOGICAL BACKGROUND

Some horological movements include complications, which require a specific fitting of the movement. For example, in the case of a coupling chronograph, it is necessary to assemble a gear disk, such as a wheel or a pinion on a shaft already fitted on the movement.

Indeed, in conventional chronographs, it is usual to arrange an additional wheel on the shaft of the second disk of the primary module of the movement, in order to take and convey the displacement movement to the chronograph module in order to actuate it.

For other types of chronographs, the removable wheel is arranged on an intermediate shaft of a transmission disk connecting the disk of the seconds counter of the chronograph to the disk of the minutes counter of the chronograph.

Further chronograph module configurations are possible. Moreover, there are further complications, which require the assembly of such a removable wheel on a shaft.

However, the assembly of this wheel is not easy, because the shaft whereon it is to be fastened is necessarily already fitted on the movement. Indeed, the shaft is kept in a bearing-block at each end, which are hafted in the plate or plate bridges, which cannot be added subsequently if the removable wheel is present on the shaft. In other words, the fitting of the shaft with the removable wheel already fastened is not possible. The wheel must be assembled with the shaft, after the latter has been at least partially fitted on the plate.

For this purpose, a hub passing through the wheel at the centre thereof is generally used, a conical end of the shaft being pressed in the hub to carry the wheel.

Nevertheless, the pressing operation has several drawbacks.

On one hand, there is a well-known risk of premature wear of certain parts. In particular, the shaft and/or the removable wheel can undergo undesired buckling or flexion, which can impede the proper operation of the movement.

On the other, the hub being generally relatively thick to withstand the pressing and support of the wheel, the latter requires resizing during fitting, in order to be able to be integrated in the movement. Furthermore, if needed, the dismantling of the additional wheel and the parts of the movement, of which the dismantling is dependent on that of the additional wheel is difficult, since it is necessary to drive out the hub of the shaft. These operations waste time, and require tools and specific skills.

SUMMARY OF THE INVENTION

The invention aims to remedy the drawbacks cited above, and is intended to provide a chronograph module including a removable wheel, the fitting and dismantling whereof are facilitated.

For this purpose, the invention relates to a chronograph module for a horological movement, the chronograph module comprising a plate and/or a plate bridge, a primary shaft extending along a longitudinal axis about which it is rotatable, the primary shaft bearing a primary disk extending in a plane substantially orthogonal to the longitudinal axis of the primary shaft, the primary shaft being fitted on the plate and/or the plate bridge, such that the primary disk is engaged with a geartrain of the chronograph module.

The invention is remarkable in that the chronograph module comprises a removable wheel fitted on the primary shaft, the removable wheel comprising a peripheral gear structure, as well as a first and a second elastic arm forming a clamp configured to grip the primary shaft, the primary shaft including a radial support surface whereon the first and the second elastic arm are supported, so as to assemble the removable wheel on the primary shaft, the chronograph module comprising at least one overlapping part disposed in a lower stage of the chronograph module, the arrangement and the dimensions of the removable wheel in the chronograph module producing an overlap of the removable wheel and said overlapping part, such that the assembly of said overlapping part required the absence of the removable wheel whereas the primary shaft is fitted on the chronograph module.

Thanks to the elastic arms forming a clamp, the removable wheel can readily be fitted on and dismantled from the primary shaft. Thus, performing hafting, which can cause defects in the parts, is avoided when the module is fitted on the horological movement. Furthermore, the removable wheel can be readily dismantled and refitting without using a specific tool, in order to have access to the parts which require the removal of the removable wheel.

According to a specific embodiment of the invention, the overlap is between one tenth and half of the diameter of the removable wheel.

According to a specific embodiment of the invention, the end of the primary shaft comprises a radial support surface for the clamp.

According to a specific embodiment of the invention, in the free state, said clamp is delimited to a cylinder of radius less than that of a cylinder delimited to said radial support surface.

According to a specific embodiment of the invention, the radial support surface is counter-conical.

According to a specific embodiment of the invention, the two arms each include a central notch, so as to form an orifice for the end of the primary shaft, preferably substantially circular.

According to a specific embodiment of the invention, the chronograph module includes a secondary shaft and a driving pinion of the chronograph arranged on the secondary shaft, a tertiary shaft and a minute counter wheel arranged on the tertiary shaft.

According to a specific embodiment of the invention, the chronograph module includes a quaternary shaft and a second disk arranged on the quaternary shaft, the quaternary shaft being arranged about a part of the secondary shaft According to a specific embodiment of the invention, the primary disk is a drive wheel of the minute counter meshing with the second disk of the chronograph arranged on the secondary shaft.

According to a specific embodiment of the invention, the removable wheel meshes with the disk of the minutes counter of the chronograph.

According to a specific embodiment of the invention, the chronograph module includes a coupling flange sliding about the secondary shaft above the second disk, between a rest position where the chronograph is not actuated, and an operating position wherein it is driven by the second disk to actuate the secondary shaft.

According to a specific embodiment of the invention, the primary shaft includes an axial banking support surface arranged to hold the removable wheel in a position along the longitudinal axis of the primary shaft.

According to a specific embodiment of the invention, the overlapping part(s) are the coupling flange and/or the hammer and/or a rotary pane.

The invention further relates to a horological movement comprising such a chronograph module.

BRIEF DESCRIPTION OF THE FIGURES

Other specific features and advantages will be clearly observed in the following description, which is given as a rough guide and in no way as a limiting guide, with reference to the accompanying drawings, in which.

DETAILED DESCRIPTION OF THE INVENTION

Figure 1:
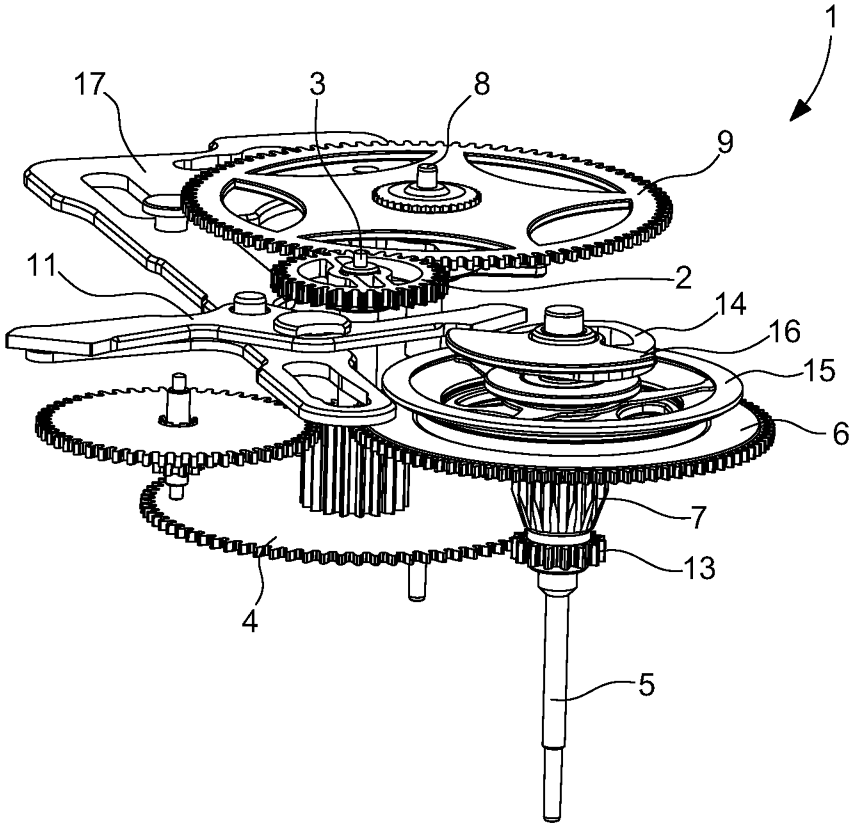
FIG. 1 is top perspective view of a chronograph module including a removable wheel and a primary shaft wherein the wheel according to the invention is fitted.
Figure 2:
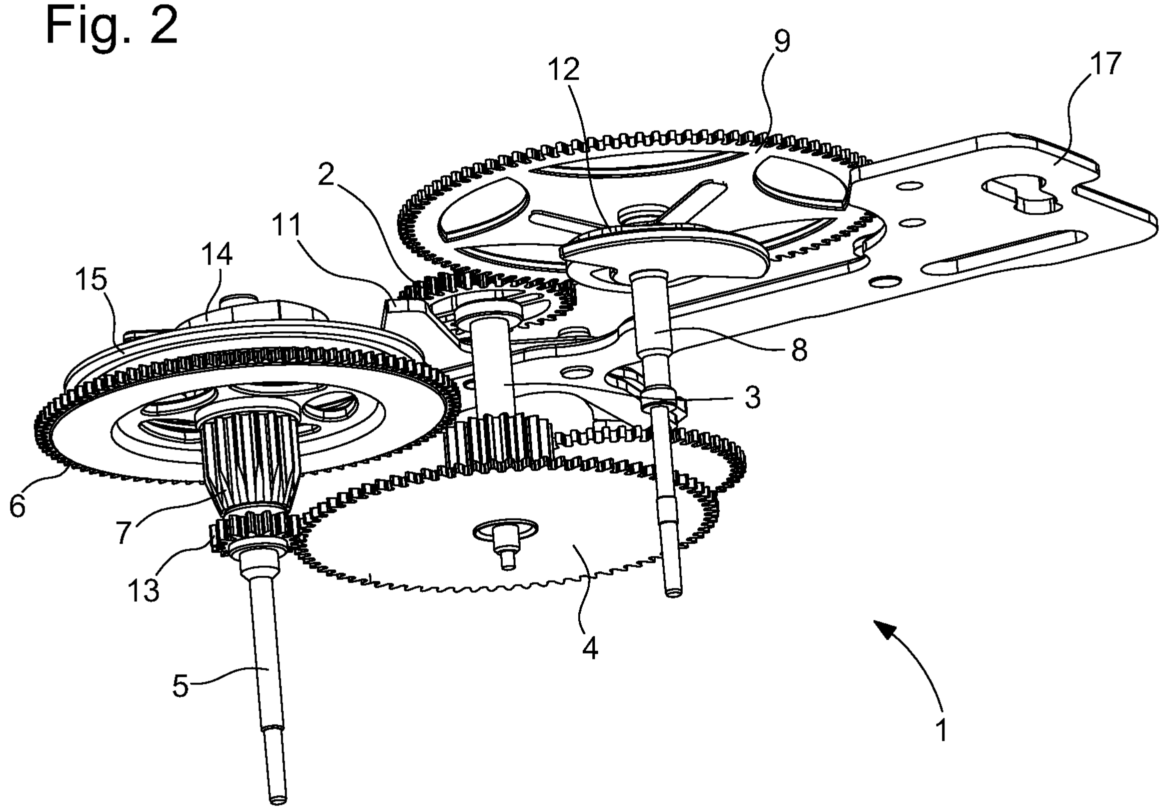
FIG. 2 is a bottom perspective view of the chronograph module of FIG. 1.
Figure 3:
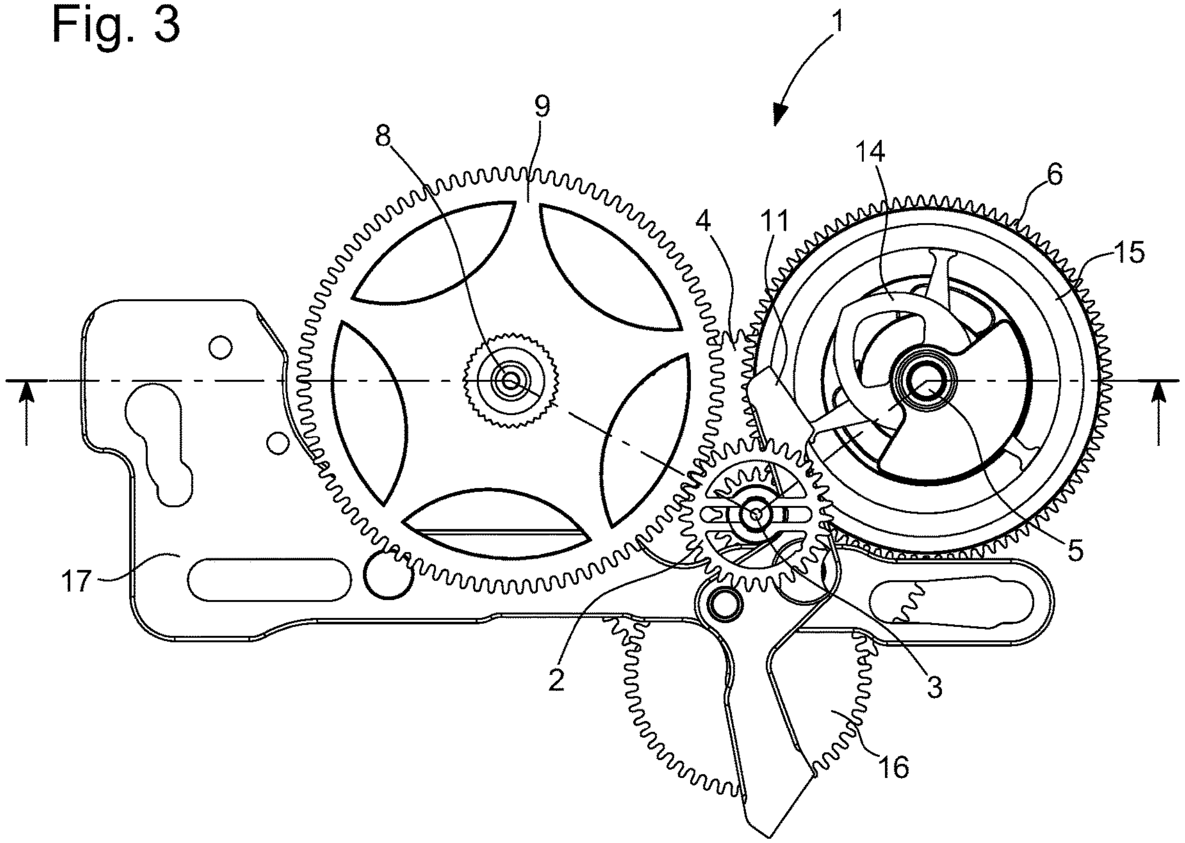
FIG. 3 is a top view of the chronograph module of FIG. 1.
Figure 4:
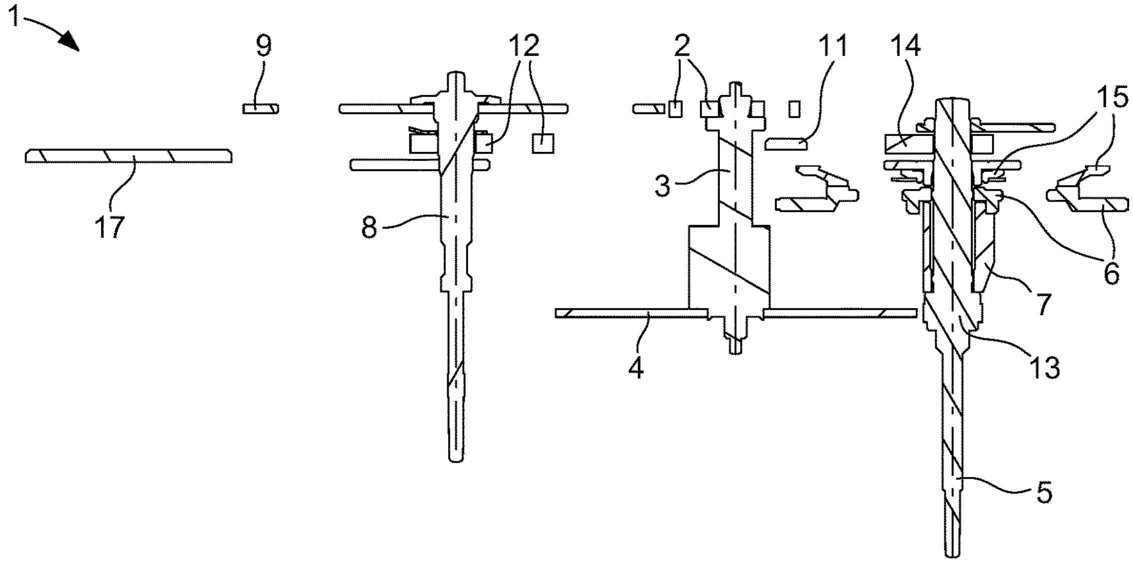
FIG. 4 is a sectional view of the chronograph module of FIG. 1.

The invention relates to a chronograph module 1 for a horological movement. The chronograph module 1, represented in FIGS. 1 to 4, comprises a primary shaft 3, a transmission shaft, a secondary shaft 5, here a second shaft of the chronograph, a tertiary shaft 8, here a minutes counter shaft of the chronograph, and a quaternary shaft 7, here a second shaft.

In this embodiment, the secondary shaft 5 is arranged inside the quaternary shaft 7. Thus, the secondary shaft 5 and the quaternary shaft 7 are coaxial. The quaternary shaft 7 can rotate independently of the secondary shaft 5. In an operating mode of the chronograph, the secondary shaft 5 and the quaternary shaft 7 rotate simultaneously, the quaternary shaft 7 driving the secondary shaft 5.

The primary shaft 3 is arranged between the secondary shaft 5 and the tertiary shaft 8, with an offset with respect to the plane passing through the three shafts. Thus, the primary 3, secondary 5 and tertiary 8 shafts are arranged at the apexes of a triangle, substantially at the same level.

The chronograph module 1 further comprises a minute counter wheel 9 arranged on the tertiary shaft 8, a driving pinion of the chronograph 13 arranged on the secondary shaft 5, and a second disk 6 arranged on the quaternary shaft 7. The minutes counter wheel 9 and the second disk 6 are disposed at an upper level of the respective shaft thereof, whereas the driving pinion of the chronograph 13 is arranged at a lower level of the secondary shaft 5.

The chronograph module 1 further comprises a coupling flange 15 configured to transmit the movement from the second disk 6 to the driving pinion of the chronograph 13.

The coupling flange 15 is arranged on the secondary shaft 5, above the second disk 6. The coupling flange 15 slides longitudinally about the secondary shaft 5, between a rest position where the chronograph module 1 is not actuated, and an operating position wherein it is driven by the second disk 6.

In the operating position, the secondary shaft 5 is driven by the coupling flange 15 with the quaternary shaft 7. Thus, the driving pinion of the chronograph 13 is rotated by the second disk 6 via the coupling flange 15.

The chronograph module 1 also comprises a primary disk 4, here a driving disk of the minute counter, which is arranged on the primary shaft 3, at a lower level of the primary shaft 3. The primary disk 4 meshes with the driving pinion 13 of the chronograph. Thus, in the operating position of the coupling flange 15, the driving pinion of the chronograph 13 rotates the primary disk 4 and the primary shaft 3.

The chronograph module 1 also comprises a hammer 17 and a rotary pane 11 borne by the hammer 17.

The chronograph module 1 includes a chronograph wheel heart-piece 14 arranged on the secondary shaft 5, above the coupling flange 15, and a second heart-piece 12 of the minute counter below the chronograph minute counter wheel 9.

Furthermore, the chronograph module 1 comprises a removable wheel 2 arranged at an upper end of the primary shaft 3. The removable wheel 2 is a transmission disk meshing with the minute counter wheel 9 of the tertiary shaft 8. Thus, when the primary shaft 3 is rotated, the removable wheel 2 actuates the rotation of the minute counter wheel 9 and the tertiary wheel 8.

Figure 5:
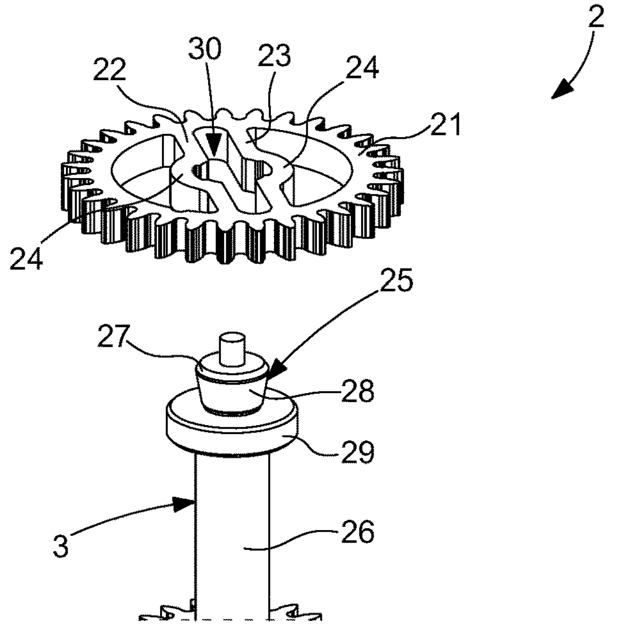
FIG. 5 is a perspective view of the removable wheel and the end of the primary shaft.

In this embodiment, the removable wheel 2 is a transmission wheel, represented in FIG. 5, the wheel comprising a peripheral gear structure 21, which is annular and comprises gear teeth.

This removable wheel 2 further includes at least a first radially elastic arm 22, and at least a second radially elastic arm 23. Preferably, the arms 22, 23 are symmetrical with respect to each other and substantially parallel. The arms 22, 23 are arranged inside the ring and each connect two opposite points of the peripheral gear structure 21.

The primary shaft 3 includes an axial banking support surface 29 which is arranged to hold the removable wheel 2 on the primary shaft 3 as banking support. The axial banking 29 makes it possible to define a precise position of the removable wheel 2 on the primary shaft 3 along the longitudinal axis in z, unlike a hafting where the position of the wheel along this direction is more difficult to control.

This first elastic arm 22 and second elastic arm 23 form a clamp 30 together, which is arranged to grip a radial support surface 28 included on the primary shaft 3 in the vicinity of the axial banking support surface 7. Friction is thus ensured between the removable wheel 2 and the primary shaft 1.

The clamp 30 is configured to grip the end 25 of the primary shaft 3. For this purpose, the primary shaft 3 includes at the end 25 thereof a radial support surface 28 whereon the first 22 and the second elastic arm 23 are supported. The elasticity of the arms 22, 23 makes it possible to separate them to insert the end 25 of the primary shaft 2 between the arms 22, 23, then allow the arms 22, 23 grip the radial support surface 28 by friction. Thus, the additional wheel can be assembled onto the primary shaft.

The radial support surface 28 is preferably inverted counter-conical so as to hold the removable wheel 2 on the end 25, against a banking arranged under the cone. The inverted cone has its base at the end of the end 25 and its apex oriented towards the middle of the primary shaft 3.

For the assembly of the removable wheel 2 on the shaft 1, the elasticity of the arms 22, 23, the removable wheel 2 is used to enable correct positioning, and, preferably, a click in position.

The primary shaft 3 includes an introduction ramp 27 arranged to radially push back the first elastic arm 22, and the second elastic arm 23 to facilitate the introduction of the removable wheel 2 on the primary shaft 3. The introduction ramp 27 is for example a chamfer arranged at the end of the primary shaft 3

Advantageously, in the free state, said clamp 30 is delimited to a cylinder of which the radius is less than that of a cylinder delimited to the radial support surface 28.

For this, the two arms 22, 23 each include a central notch 24, so as to form an orifice for the end 25 of the primary shaft 3, the orifice preferably substantially circular The chronograph module 1 comprises at least one overlapping part fitted in a lower stage of the chronograph module 1. The arrangement and the dimensions of the removable wheel 2 in the chronograph module 1 produces an overlap of the removable wheel 2 above said overlapping part.

In the embodiment described, there are several overlapping parts, which require the absence of the removable wheel 2 to be able to be assembled in the chronograph module 1.

Here, the overlapping parts are the coupling flange 15, the rotary pane 11 and the hammer 17. When it is assembled on the primary shaft 3, the removable wheel 2 overlaps the overlapping parts. In other words, the projection of the removable wheel 2 orthogonally to the extension plane thereof and parallel with the primary shaft 3 on the overlapping parts.

The coupling flange 15 has a radius greater than the result of subtracting the radius of the removable wheel 2 from the distance between the primary shaft 3 and the secondary shaft 5, such that a peripheral part of the coupling flange 15 is arranged below a peripheral part of the removable wheel 2 when they are assembled in the chronograph module 1.

The rotary pane 11 is arranged near the primary shaft 3. A portion of the rotary pane 11 passes directly below the removable wheel 2. A portion of the hammer 17 also passes directly below the removable wheel 2.

In this case, the assembly of these overlapping parts requires the absence of the removable wheel 2 whereas the primary shaft 2 is fitted on the chronograph module 1. Indeed, it is not possible to fit these overlapping parts in the chronograph module 1 if the removable wheel 2 is already fitted on the primary shaft 3.

Thanks to the clamp 30, the removable wheel 2 can readily be removed from or assembled with the primary shaft 3. It particularly facilitates the repair or cleaning of a part of the chronograph module 1, which requires the removal of the removable wheel 2.

Figure 6:
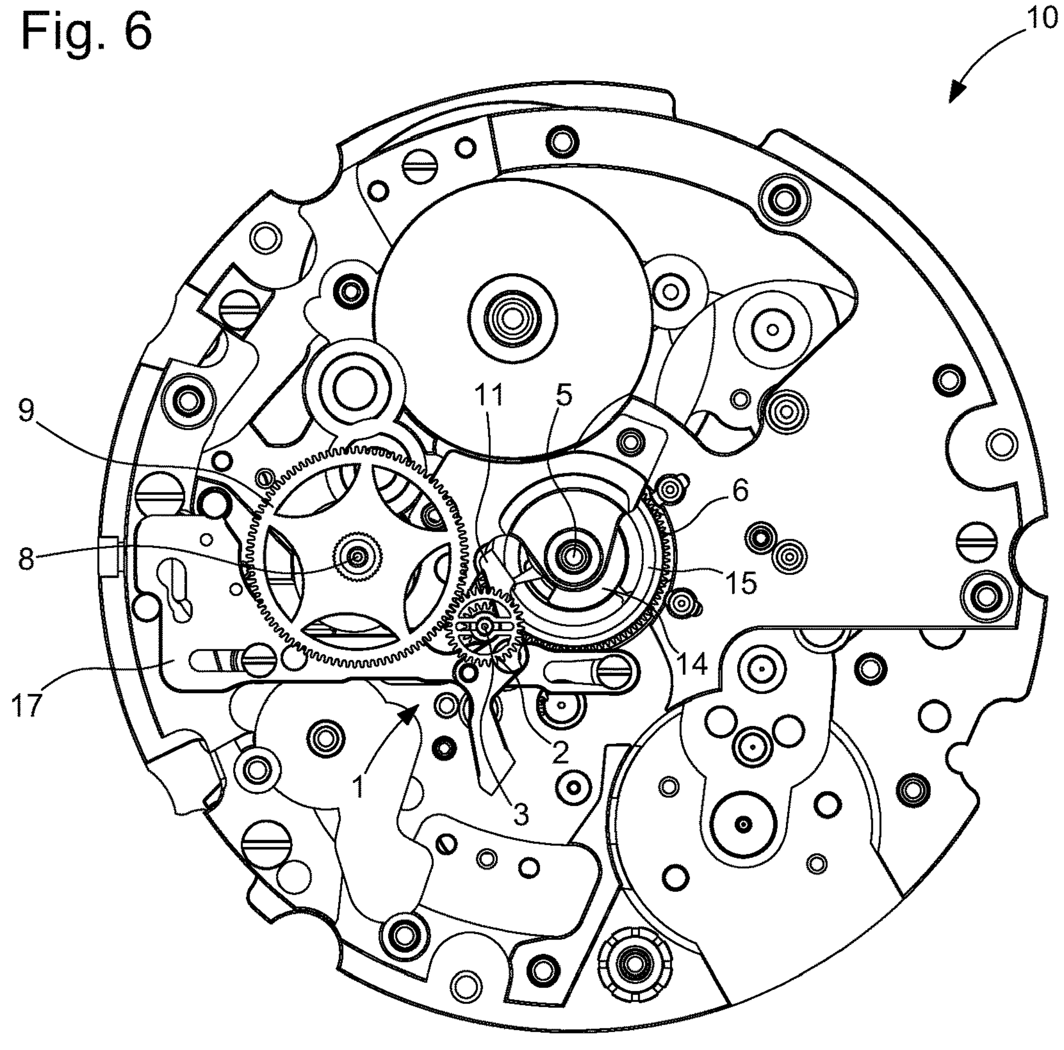
FIG. 6 is a top view of a horological movement including a chronograph module according to the invention.

FIG. 6 shows a horological movement wherein the chronograph module according to the invention is fitted. On the top face, the minute counter wheel 9, the second disk 6, and the removable wheel 2 meshing with the minute counter wheel 9 are observed.

This figure clearly illustrates the need to remove the removable wheel 2 to be able to assemble certain overlapping parts, such as the coupling flange 15 or the rotary pane 11.

It goes without saying that the invention is not limited to the embodiments described with reference to the figures and alternatives can be considered without leaving the scope of the invention.

The invention claimed is:

1. A chronograph module (1) for a horological movement, the chronograph module (1) comprising a plate and/or a plate bridge, a primary shaft (3) extending along a longitudinal axis about which the primary shaft is rotatable, the primary shaft (3) bearing a primary disk (4) extending a substantially orthogonal plane to the longitudinal axis of the primary shaft (3), the primary shaft (3) being fitted on the plate and/or the plate bridge, such that the primary disk (4) is engaged with a geartrain of the chronograph module (1), wherein the chronograph module (1) comprises a removable wheel (2) fitted on the primary shaft (3), the removable wheel (2) comprising a peripheral gear structure, as well as a first (22) and a second elastic arm (23) forming a clamp (30) configured to grip the primary shaft (3), the primary shaft (3) including a radial support surface (25) whereon the first (22) and the second elastic arm (23) are supported, so as to assemble the removable wheel (2) on the primary shaft (3), wherein the chronograph module (1) comprises at least one overlapping part disposed in a lower stage of the chronograph module (1), the arrangement and dimensions of the removable wheel (2) in the chronograph module (1) producing an overlap of the removable wheel (2) and said overlapping part, such that the assembly of said overlapping part required the absence of the removable wheel (2) and the presence of the primary shaft (3) in the chronograph module (1), and wherein the chronograph module further comprises a secondary shaft (5) and a driving pinion of a chronograph (13) arranged on the secondary shaft (5), a tertiary shaft (8) and a minute counter wheel (9) arranged on the tertiary shaft (8).

2. The chronograph module according to claim 1, wherein the overlap is between one tenth and half of the diameter of the removable wheel (2).

3. The chronograph module according to claim 1, wherein the end (25) of the primary shaft (3) comprises a radial support surface (28) for the clamp (30).

4. The chronograph module according to claim 3, wherein in the free state, said clamp (30) is delimited to a cylinder of radius less than that of a cylinder delimited to said radial support surface (28).

5. The chronograph module according to claim 1, wherein the radial support surface (28) is counter-conical.

6. The chronograph module according to claim 1, wherein the two arms (22, 23) each include a central notch, so as to form an orifice for the end (25) of the primary shaft (3).

7. The chronograph module according to claim 1, further comprising a quaternary shaft (7) and a second disk (6) arranged on the quaternary shaft (7), the quaternary shaft (7) being arranged about a part of the secondary shaft (5).

8. The chronograph module according to claim 7, wherein the primary disk (4) is a drive wheel of the minute counter wheel meshing with the second disk (6) of the chronograph arranged on the secondary shaft (5).

9. The chronograph module according to claim 8, wherein the removable wheel (2) meshes with the minute counter wheel of the chronograph.

10. The chronograph module according to claim 8, further comprising a coupling flange (15) sliding about the secondary shaft (5) above the second disk (6), between a rest position where the chronograph is not actuated, and an operating position wherein the chronograph is driven by the second disk (6) to actuate the secondary shaft (5).

11. The chronograph module according to claim 1, wherein the primary shaft (3) includes an axial banking support surface (29) arranged to hold the removable wheel (2) in a position along the longitudinal axis of the primary shaft (3).

12. The chronograph module according to claim 1, wherein the overlapping part(s) are a coupling flange (15) and/or a hammer (17) and/or a rotary pane (11).

13. A horological movement comprising a plate, drive means, and a chronograph module (1) according to claim 1.

* * * * *